(12) United States Patent
Ramanathan et al.

(10) Patent No.: US 11,128,619 B1
(45) Date of Patent: *Sep. 21, 2021

(54) SECURE ACCESS FOR ASSISTED TRANSACTIONS IN AN ONLINE BANKING SYSTEM

(71) Applicant: Wells Fargo Bank, N.A., San Francisco, CA (US)

(72) Inventors: Ramanathan Ramanathan, Bellevue, WA (US); Abhijit Rao, Irvine, CA (US); Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,404

(22) Filed: Dec. 19, 2019

Related U.S. Application Data

(63) Continuation of application No. 15/610,336, filed on May 31, 2017, now Pat. No. 10,554,654.

(51) Int. Cl.
*H04L 29/06* (2006.01)
*G06F 40/58* (2020.01)
(Continued)

(52) U.S. Cl.
CPC .......... *H04L 63/0853* (2013.01); *G06F 40/30* (2020.01); *G06F 40/58* (2020.01);
(Continued)

(58) Field of Classification Search
CPC .... G06Q 20/401; G06Q 20/42; G06Q 20/425; G06Q 20/40; H04L 63/0853; G06F 40/58; G06F 40/30
See application file for complete search history.

(56) References Cited

U.S. PATENT DOCUMENTS 6,035,332 A  3/2000  Ingrassia, Jr. et al.
6,748,420 B1  6/2004  Quatrano et al.
(Continued)

FOREIGN PATENT DOCUMENTS

WO  2014004913 A1  1/2014

OTHER PUBLICATIONS

Prosecution History from U.S. Appl. No. 16/000,453, dated May 31, 2017 through Sep. 29, 2019, 37 pp.

*Primary Examiner* — Daniel B Potratz
(74) *Attorney, Agent, or Firm* — Shumaker & Sieffert, P.A.

(57) ABSTRACT

Techniques are described for secure access for assisted transactions in an online banking system. A server of the online banking system is configured to establish an assisted session during which both a primary user and an assistant user have secure access to the primary user's account via their respective computing devices. The techniques enable the assistant user to request transactions with the primary user's account on the primary user's behalf, and further enable the primary user to approve the requested transactions prior to performance. The techniques include translating the requested transactions into a natural language description that is understandable to the primary user, and presenting the natural language description to the primary user for approval or denial of the requested transaction. In this way, a primary user may receive the assistance necessary to use an online banking system without giving up all control over the primary user's account.

20 Claims, 7 Drawing Sheets

(51) Int. Cl.
  *G06Q 20/40* (2012.01)
  *G06F 40/30* (2020.01)
  *G06Q 20/42* (2012.01)
  *G06Q 20/22* (2012.01)

(52) U.S. Cl.
  CPC ......... *G06Q 20/2295* (2020.05); *G06Q 20/40* (2013.01); *G06Q 20/42* (2013.01); *H04L 63/083* (2013.01); *H04L 63/10* (2013.01)

(56) References Cited

U.S. PATENT DOCUMENTS

| | | | |
|---|---|---|---|
| 7,139,795 B2 | 11/2006 | Davis | |
| 7,664,691 B2 | 2/2010 | West | |
| 7,933,955 B2 | 4/2011 | Khalatian | |
| 8,224,970 B2 | 7/2012 | Nishiyama | |
| 8,442,868 B2 | 5/2013 | Collas et al. | |
| 8,793,189 B2 | 7/2014 | Kemper et al. | |
| 9,141,332 B2 | 9/2015 | Coleman et al. | |
| 10,554,654 B1 | 2/2020 | Ramanathan et al. | |
| 2005/0097159 A1 | 5/2005 | Skidgel | |
| 2006/0282377 A1* | 12/2006 | Edwards | G06Q 40/02 705/39 |
| 2008/0031986 A1 | 2/2008 | Tripp et al. | |
| 2010/0145850 A1 | 6/2010 | Nagai et al. | |
| 2011/0055058 A1* | 3/2011 | Hammad | G06Q 20/425 705/30 |
| 2011/0126130 A1 | 5/2011 | Lieb et al. | |
| 2012/0197793 A1* | 8/2012 | Grigg | G06Q 20/42 705/41 |
| 2015/0039998 A1 | 2/2015 | Lieb et al. | |
| 2015/0120546 A1* | 4/2015 | Fernandes | G06Q 20/229 705/44 |
| 2018/0012163 A1 | 1/2018 | Smith et al. | |

* cited by examiner

SECURE ACCESS FOR ASSISTED TRANSACTIONS IN AN ONLINE BANKING SYSTEM

This application is a continuation of U.S. application Ser. No. 15/610,336, filed May 31, 2017, the contents of this application are hereby incorporated by reference in their entirety.

TECHNICAL FIELD

The disclosure relates to secure access to financial accounts.

BACKGROUND

Many customers use their financial institution's online banking system to perform transactions from their accounts, e.g., online bill pay, money transfers, stock trades, fund allocation changes, and other wealth management activities. For example, a customer may securely access a website of the online banking system via a computing device executing a browser, an application, or other software capable of supporting the website. The computing device may be any of a wide range of devices, including a laptop or desktop computer, tablet computer, so-called "smart" phone, "smart" pad, "smart" watch, an Internet of Things (IoT) device, or other personal digital appliance equipped for wired or wireless communication.

Typically, a customer is able to request transactions via the online banking system from their own computing device without assistance. Some customers, however, may require assistance while using the online banking system due to a physical or mental disability, mental incompetency, or simply computer-illiteracy or technophobia. In such situations, the customer may share their access credentials to allow a friend, relative, or custodian to access the customer's account via the online banking system to request any necessary transactions with the customer's account on the customer's behalf. Sharing access credentials, however, even with a trusted individual, may leave the customer vulnerable to the performance of unwanted and unauthorized transactions from their accounts.

SUMMARY

In general, this disclosure describes techniques for secure access for assisted transactions in an online banking system. According to the techniques, a server of the online banking system is configured to establish an assisted session during which both a primary user, e.g., a customer, and an assistant user, e.g., a friend, relative, or custodian of the customer, have secure access to the primary user's account via their respective computing devices. The techniques enable the assistant user to request transactions with the primary user's account on the primary user's behalf, and further enable the primary user to approve the requested transactions prior to performance. In order to make the approval process relatively easy for the primary user, the techniques include translating the requested transactions into a natural language description that is understandable to the primary user, and presenting the natural language description to the primary user for approval or denial of the requested transaction. In this way, a primary user may receive the assistance necessary to use an online banking system without giving up all control over the primary user's account, and without having to understand, or even view, the standard user interface of the online banking system.

In one example, this disclosure is directed to a computer-implemented method comprising establishing, by a server, an assisted session for a primary user account during which both a primary user device and an assistant user device have secure access to the primary user account; receiving, by the server and from the assistant user device, a request for a transaction with the primary user account; generating, by the server, a natural language description of the requested transaction; sending, by the server, data representative of the natural language description of the requested transaction to the primary user device; and, in response to receiving approval of the requested transaction from the primary user device, performing, by the server, the requested transaction with the primary user account.

In another example, this disclosure is directed to a server device comprising a memory, and one or more processors in communication with the memory. The one or more processors are configured to establish an assisted session for a primary user account during which both a primary user device and an assistant user device have secure access to the primary user account; receive, from the assistant user device, a request for a transaction with the primary user account; generate a natural language description of the requested transaction; send data representative of the natural language description of the requested transaction to the primary user device; and, in response to receiving approval of the requested transaction from the primary user device, perform the requested transaction with the primary user account.

In a further example, this disclosure is directed to a computer-readable storage medium storing instructions that, when executed, cause one or more processors of a server device to establish an assisted session for a primary user account during which both a primary user device and an assistant user device have secure access to the primary user account; receive, from the assistant user device, a request for a transaction with the primary user account; generate a natural language description of the requested transaction; send data representative of the natural language description of the requested transaction to the primary user device; and, in response to receiving approval of the requested transaction from the primary user device, perform the requested transaction with the primary user account.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
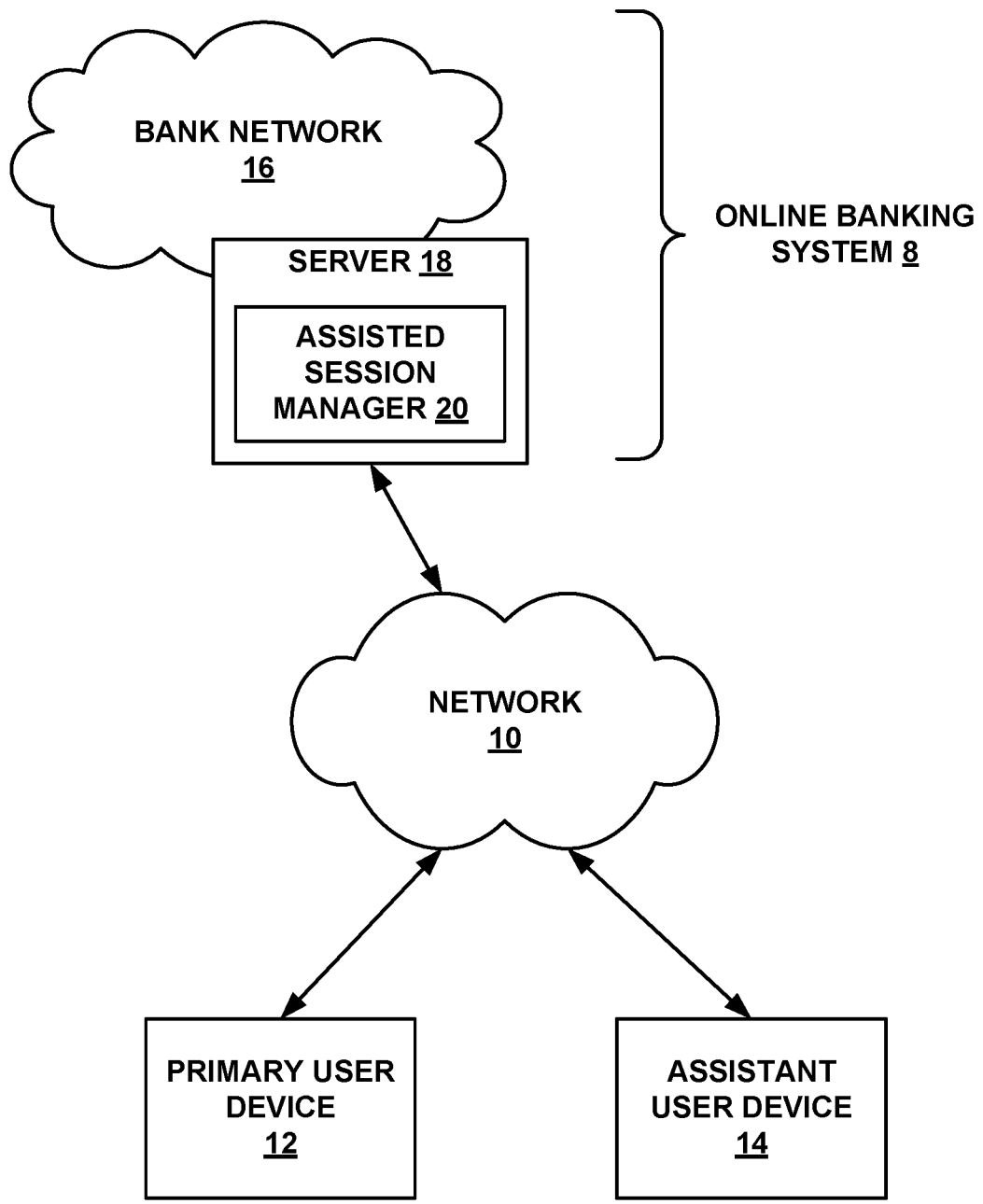
FIG. 1 is a block diagram illustrating an example online banking system including a server configured to provide secure access to both a primary user and an assistant user for an assisted session with the online banking system, in accordance with the techniques of this disclosure.

FIG. 1 is a block diagram illustrating an example online banking system 8 including a server 18 configured to provide secure access to both a primary user and an assistant user for an assisted session with online banking system 8, in accordance with the techniques of this disclosure. As illustrated in FIG. 1, online banking system 8 includes a bank network 16 and server 18 executing an assisted session manager 20. Assisted session manager 20 is configured to establish an assisted session for a primary user account stored in bank network 16 during which both the primary user, e.g., a customer, and an assistant user, e.g., a friend, relative, or custodian of the customer, have secure access to the primary user's account via their respective computing devices, primary user device 12 and assistant user device 14.

Primary user device 12 and assistant user device 14 may each comprise any of a wide range of user devices, including laptop or desktop computers, tablet computers, so-called "smart" phones, "smart" pads, "smart" watches, Internet of Things (IoT) devices, or other personal digital appliances equipped for wired or wireless communication. Each of primary user device 12 and assistant user device 14 may include at least one user interface device (not shown) that enables a user of the respective computing device to interact with computing device. In some examples, the user interface device of either primary user device 12 or assistant user device 14 may be configured to receive tactile, audio, or visual input. In addition to receiving input from the user, the user interface device of either primary user device 12 or assistant user device 14 may be configured to output content such as a graphical user interface (GUI) for display, e.g., at a display device associated with the respective computing device.

As shown in FIG. 1, primary user device 12 and assistant user device 14 communicate with server 18 of bank network 16 via network 10. Network 10 may comprise a public network, such as the Internet, or a private network. Although illustrated as a single entity, network 10 may comprise a combination of public and/or private networks. In some examples, network 10 may comprise one or more of a wide area network (WAN) (e.g., the Internet), a local area network (LAN), a virtual private network (VPN), or another wired or wireless communication network.

Bank network 16 may be a private network associated with a bank or other financial institution. Bank network 16 may comprise a centralized or distributed system of computing devices, such as desktop computers, laptops, workstations, wireless devices, network-ready appliances, file servers, print servers, or other devices. For example, bank network 16 may include a plurality of databases, data centers, and other storage facilities in which customer credentials and customer financial accounts, e.g., checking, savings, credit, retirement, or loan accounts, are stored. In addition, bank network 16 may include a plurality of computing devices configured to manage the customer financial accounts and process internally- and externally-generated transactions with the customer financial accounts. Bank network 16 may further include a plurality of access servers, e.g., server 18, that host website portals to online banking system 8 through which external computing devices, e.g., primary user device 12 and assistant user device 14, may securely access one or more of the customer financial accounts stored in bank network 16.

In some examples, server 18 may be configured to provide primary user device 12 with secure access to a primary user account owned by a primary user and stored in bank network 16. For example, the primary user may securely access a website portal of online banking system 8 using primary user device 12 executing a browser, an application, or other software capable of supporting the website. Server 18 may authenticate the primary user based on credentials of the primary user received from primary user device 12, and enable primary user device 12 to perform transactions with the primary user account, e.g., online bill pay, money transfers, stock trades, fund allocation changes, and other wealth management activities, via the website portal of online banking system 8.

Typically, the primary user is able to request transactions via online banking system 8 from primary user device 12 without assistance. In some situations, however, the primary user may require assistance while using online banking system 8 due to a physical or mental disability, mental incompetency, or simply computer-illiteracy or technophobia. In one example, the primary user may be an elderly person and the assistant user may be the elderly person's child or custodian. It may be difficult for the assistant user to help the primary user access the primary user account via online banking system 8 when the assistant user is remote, i.e., not physically with the primary user. Traditionally, the primary user would need to share their access credentials to allow the assistant user to access the primary user account via online banking system 8 when the assistant user is not physically with the primary user. Sharing access credentials, however, even with a trusted individual, may leave the primary user vulnerable to the performance of unwanted and unauthorized transactions with their accounts.

According to the techniques described in this disclosure, server 18 of bank network 16 may include one or more processors configured to execute assisted session manager 20 to provide secure access to both primary user device 12 and assistant user device 14 for an assisted session for the primary user account of the primary user. In general, the disclosed techniques establish an online trust, e.g., a "smart" contract, between the primary user and the assistant user, enable the assistant user to access the primary user account securely and in a trusted way, enable the primary user to monitor and control the assistant user's activities with the primary user account in real time, and complete transactions with the primary user account that are requested by the assistant user and approved by the primary user.

Assisted session manager 20 of server 18 may register both the primary user of primary user device 12 and the assistant user of assistant user device 14 to participate in assisted sessions with online banking system 8 for the primary user account. The registration process may include generating and/or storing a contract between the primary user and the assistant user that defines access rights to the primary user account for the assistant user. For example, the contract may be a "smart" contract generated between the primary user and the assistant user (or between their computing devices 12, 14) using blockchain, cloud servers, or bank servers, e.g., server 18. The smart contract may be software logic executed by each of primary user device 12, assistant user device 14, and server 18 used to manage or facilitate elements of the assisted session.

Server 18 may receive a request from primary user device 12 for an assisted session including credentials of the primary user, and may validate primary user device 12 to access the primary user account based on the credentials of the primary user. In some examples, in response to validating primary user device 12 for the requested assisted session, server 18 may generate an access control token for the requested assisted session and send the access control token to assistant user device 14. In other examples, primary user device 12 may generate and send the access control token to assistant user device 14. The access control token may specify the contract between the primary user and the assistant user, and may further specify assisted session-specific access rights to the primary user account for the assistant user.

Server 18 may then receive a request from assistant user device 14 to join the assisted session including credentials of the assistant user and the access control token, and may validate assistant user device 14 to access the primary user account based on the credentials of the assistant user and the access control token. Server 18 may also validate the contract specified by the access control token. Assisted session manager 20 may then establish the assisted session with access rights to the primary user account for the assistant user defined by the contract and/or the access control token.

Upon establishment of the assisted session with online banking system 8 for the primary user account, assisted session manger 20 of server 18 sends data representative of a user interface of online banking system 8 to assistant user device 14. The user interface presented on assistant user device 14 enables the assistant user to request transactions with the primary user account on the primary user's behalf. Assisted session manager 20 of server 18 then sends data representative of another user interface to primary user device 12. The user interface presented on primary user device 12 enables the primary user to approve or deny the requested transactions.

In order to make the approval process relatively easy for the primary user, assisted session manager 20 is configured to translate each of the requested transactions into a natural language description that is understandable to the primary user. For example, assisted session manager 20 may map the requested transaction to an intermediate language, e.g., machine language, description of the transaction, and then translate the intermediate language description into the natural language description based on language settings for the primary user. The language settings may include a preferred human language, a preferred one of text, audio, picture, or video, and/or a preferred font, color, size, or format of text. Assisted session manager 20 then sends data representative of the natural language description to primary user device 12 for display to the primary user and approval or denial of the requested transaction via the user interface on primary user device 12. In this way, the primary user may receive the assistance necessary to use online banking system 8 without giving up all control over the primary user account, and without having to understand, or even view, the user interface of online banking system 8.

The architecture of online banking system 8 illustrated in FIG. 1 is shown for exemplary purposes only and should not be limited to this architecture. Online banking system 8 illustrated in FIG. 1 shows a single server 18 in communication with a single primary user device 12 and a single assistant user device 14. In other examples, online banking system 8 may include multiple different servers configured to establish primary user sessions and/or assisted sessions for a primary user account stored in bank network 16. In still other examples, server 18 may be in communication with multiple primary user devices and multiple assistant user devices and provide secure access to multiple different primary user accounts stored in bank network 16. Moreover, in some scenarios, server 18 may provide more than one assistant user device with secure access to the same primary user account, or server 18 may provide the same assistant user device 14 with secure access to multiple different primary user accounts.

Figure 2:
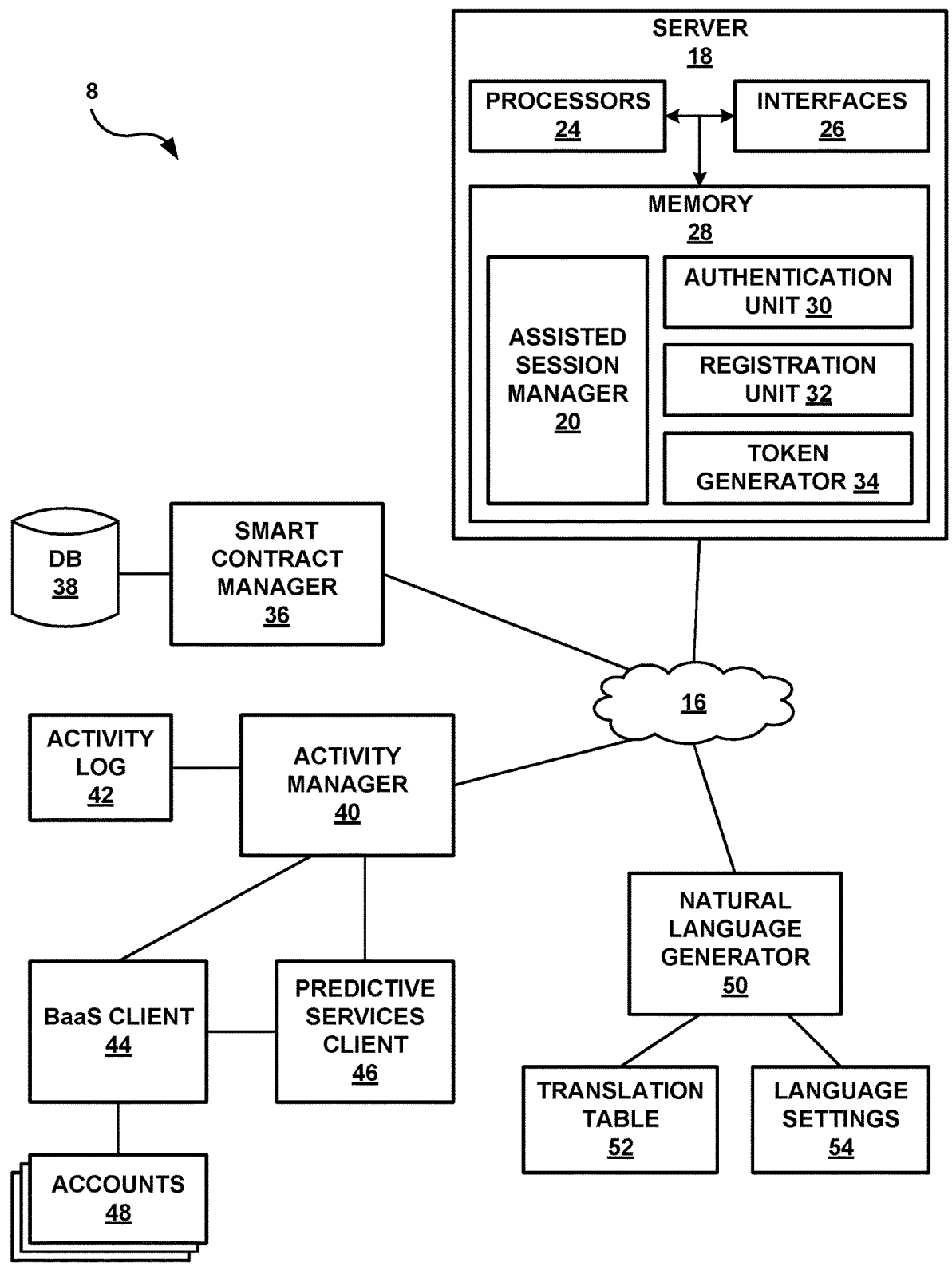
FIG. 2 is a block diagram illustrating an example server and bank network of the online banking system from FIG. 1, in accordance with the techniques of this disclosure.

FIG. 2 is a block diagram illustrating an example of server 18 and bank network 16 of online banking system 8 from FIG. 1, in accordance with the techniques of this disclosure. The architectures of server 18 and bank network 16 illustrated in FIG. 2 are shown for exemplary purposes only. Server 18 and bank network 16 should not be limited to the illustrated example architecture. In other examples, server 18 and bank network 16 may be configured in a variety of ways.

As shown in the example of FIG. 2, server 18 includes one or more processors 24, one or more interfaces 26, and one or more memory units 28. Server 18 includes assisted session manager 20, authentication unit 30, registration unit 32, and token generator 34, each of which may be implemented as program instructions and/or data stored in memory 28 and executable by processors 24 or implemented as one or more hardware units or devices of server 18. Memory 28 of server 18 may also store an operating system (not shown) executable by processors 24 to control the operation of components of server 18. Although not shown in FIG. 2, the components, units or modules of server 18 are coupled (physically, communicatively, and/or operatively) using communication channels for inter-component communications. In some examples, the communication channels may include a system bus, a network connection, an inter-process communication data structure, or any other method for communicating data.

Processors 24, in one example, may comprise one or more processors that are configured to implement functionality and/or process instructions for execution within server 18. For example, processors 24 may be capable of processing instructions stored by memory 28. Processors 24 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 28 may be configured to store information within server 18 during operation. Memory 28 may include a computer-readable storage medium or computer-readable storage device. In some examples, memory 28 include one or more of a short-term memory or a long-term memory. Memory 28 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 28 are used to store program instructions for execution by processors 24. Memory 28 may be used by software or applications running on server 18 (e.g., assisted session manager 20, authentication unit 30, registration unit 32, and token generator 34) to temporarily store information during program execution.

Server 18 may utilize interfaces 26 to communicate with external devices via one or more networks, e.g., network 10 of FIG. 1 and bank network 16. Interfaces 26 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, server 18 utilizes interfaces 26 to wirelessly communicate with external devices, e.g., primary user device 12 or assistant user device 14 of FIG. 1, or other computing devices within bank network 16.

Bank network 16 includes one or more computing devices configured to perform different functions of online banking system 8. For example, in the illustrated example of FIG. 2, bank network 16 includes a smart contract manager 36 with an associated smart contract database (DB) 38, an activity manager 40 with an associated activity log 42, Banking as a Service (BaaS) client 44 that provides access to financial accounts 48 held by the bank, predictive service client 46, and natural langue generator 50 with an associated translation table 52 and language settings 54. Each of smart contract manager 36, activity manager 40, BaaS client 44, predictive services client 46, and natural language generator 50 may be implemented as program instructions executable by processors of the one or more computing devices within bank network 16, or implemented as one or more hardware units or devices of the one or more computing devices within bank network 16.

In accordance with the techniques described in this disclosure, assisted session manager 20 of server 18 is configured to provide secure access to both a primary user device and an assistant user device (e.g., primary user device 12 and assistant user device 14 of FIG. 1) for a primary user account stored in accounts 48 of bank network 16 during an assisted session with online banking system 8. Registration unit 32 of server 18 may register both the primary user and the assistant user with the bank such that each of the primary user and the assistant user has their own access credentials to log into online banking system 8. The access credentials for each user may include a login ID and password combination, a personal identification number (PIN), a biometric ID (e.g., one or more fingerprints or a retinal scan), or some combination thereof.

In some examples, for each of the users, the access credentials may be the same for either a primary session with online banking system 8 or an assisted session with online banking system 8. In other words, the assistant user may input the same access credentials to access their own financial accounts stored in accounts 48 of bank network 16, or to access the primary user account on the primary user's behalf during an assisted session. In other examples, the assistant user may use a different set of access credentials to log into an assisted session with online banking system 8.

For the primary user to receive supporting from the assistant user during an assisted session with online banking system 8, registration unit 32 of server 18 may also store a contract between the primary user and the assistant user that defines access rights to the primary user account for the assistant user. For example, registration unit 32 of server 18 may communicate with smart contract manager 36 within bank network 16 to store the contract in contract database 38 with a unique contract ID representing the contract and the parties involved. In this way, the unique contract ID is linked to the relationship between the primary user and the assistant user.

In some cases, the contract may be agreed to and in place between the primary user and the assistant user prior to requesting an assisted session with online banking system 8. In this case, the contract may be transmitted, by either primary user device 12 or assistant user device 14, to registration unit 32 of server 18 for storage in contract database 38. In other cases, the contract may be created upon the primary user requesting an assisted session with an identified assistant user. In this case, registration unit 32 of server 18 may generate the contract between the primary user and the assistant user, and store the contract in contract database 38.

As one example, the contract may be a "smart" contract generated between the primary user and the assistant user (or between their computing devices 12, 14) using blockchain, cloud servers, or bank servers, e.g., server 18. The smart contract may be software logic executed by each of primary user device 12, assistant user device 14, and server 18 used to manage or facilitate elements of the assisted session. In some examples, the unique contract ID may be representative of a public key of a public/private encryption key pair in which the private key is known only to the contract generator (e.g., server 18 or primary user device 12), and the public key is known only to primary user device 12, assistant user device 14, and server 18 of bank network 16. In other examples, the unique contract ID may be representative of secret sharing or another encryption scheme.

The contract between the primary user and the assistant user may define default access rights to the primary user account for the assistant user. For example, within the contract, the primary user may specify an identity of the assistant user (or assistant users) allowed to access the primary user account, default access rights for the assistant user, e.g., permission to view, request transactions, or print, and whether the assistant user needs real time approval for each activity performed. The contract may also set maximum transfer limits, limit access to only certain accounts owned by the primary user, and set a time limit for access to the allowed accounts. In addition, within the contract, the primary user may specify preferred forms of the natural language description used for each possible activity, e.g., <user> logged in at <time> from <location>; <user> viewing checking account xxx7823 page ; <user> transferring <$x.x> to <account> at <time>; or <user> bill pay <$x.x> to <company name> at <time>. Within the contract, the primary user may also specify a level of verbosity or explanation for the natural language description for each possible activity. In some cases, the natural language description for each possible activity may have default text that the user can modify.

To initiate an assisted session with online banking system 8 for the primary user account, server 18 of bank network 16 receives a request for the assisted session from the primary user device 12 that includes the primary user's access credentials. Authentication unit 30 of server 18 validates primary user device 12 to access the primary user account based on the access credentials of the primary user. Once the primary user is logged into online banking system 8, server 18 or primary user device 12 may send a login prompt to assistant user device 14 requesting the assistant user to join the assisted session. Server 18 may then receive a request to join the assisted session for the primary user account from assistant user device 14 that includes the assistant user's credentials and an access control token to identify the assistant user as the assistant for the primary user.

Token generator 34 of server 18 may generate the access control token for the assistant user to join the requested assisted session. The access control token may be a multi-digit alpha-numeric code (e.g., 4-, 5-, 6-, or 8-digits). In some examples, token generator 34 may generate a single access control token for a given assisted session with online banking system 8 for the primary user account. In other examples, token generator 34 may generate a different access control token for each transaction performed by assistant user device 14 during a given assisted session for the primary user account.

Token generator 34 may generate the access control token to specify at least the primary user, the assistant user, the primary user account, and the unique contract ID that identifies the contract between the primary user and the assistant user (or their devices). For example, once the primary user is logged into online banking system 8, token generator 34 may determine an assistant user for the requested assisted session based on an indication received from the primary user, a profile associated with the primary user, or assisted session contracts of the primary user stored in contract database 38. The access control token may also specify the date and time of the token generation, and a life of the token (e.g., 10 minutes). In some examples, along with the request for the assisted session from primary user device 12, server 18 may receive an indication of one or more types of transactions allowed to be performed by the assistant user during the requested assisted session (e.g., only bill payments, only viewing, or bill payments and stock transactions). The access control token may further specify the one or more types of transactions allowed for the requested assisted session.

Once generated, server 18 may send the access control token to assistant user device 14 via an out-of-band communication channel, e.g., via text, chat, SMS, email, or other messaging service. The out-of-bank communication channel is different than the in-band communication channel over which server 18 authorizes access to the primary user account by assistant user device 14. In some cases, server 18 may encrypt the access control token via the private key of the unique contract ID or via some other encryption scheme prior to sending the token to assistant user device 14.

As described in more detail below with respect to FIG. 3, in other examples, primary user device 12 may be responsible for generating the access control token upon being validated for the requested assisted session, and sending the access control token to server 18 and assistant user device 14. In still other examples, server 18 may generate the access control token for the assistant user as described above, and then send the access control token to primary user device 12 to send to assistant user device 14. In these examples, primary user device 12 may encrypt the access control token via the private key of the unique contract ID or via some other encryption scheme.

Server 18 next receives the request to join the assisted session with online banking system 8 for the primary user account from assistant user device 14 that includes the assistant user's credentials and the access control token. In some cases, server 18 may receive an encrypted access control token from assistant user device 14, and decrypt the access control token via the private key of the unique contract ID or via some other decryption scheme. Authentication unit 30 of server 18 validates assistant user device 14 to access the primary user account based on the credentials of the assistant user and the access control token. Authentication unit 30 of server 18 may also validate the contract identified by the unique contract ID specified by the access control token. For example, authentication unit 30 may use the unique contract ID to lookup the contract in contract database 38 and confirm the contract's validity and the parties involved.

Assisted session manager 20 of server 18 may then establish the assisted session with access rights to the primary user account for the assistant user defined by the contract and/or the access control token. Control of the assisted session with online banking system 8 for the primary user account is transferred from the primary user to the assistant user but, according to the disclosed techniques, the assistant user is bound by the contract with the primary user and by the approval of the primary user.

Once the assisted session is established, assisted session manager 20 of server 18 receives a request from assistant user device 14 for a transaction with the primary user account. For each transaction requested by assistant user device 14, assisted session manager 20 communicates with natural language generator 50 to generate a natural language description of the requested transaction for presentation to the primary user. The natural language descriptions may be generated according to language settings 54 for the primary user. Language settings 54 may include a preferred human language, a preferred one of text, audio, picture, or video, and/or a preferred font, color, size, or format of text for the primary user.

For example, in the case where the primary user is an elderly person, the natural language descriptions may be presented via a user interface on primary user device 12 with a large, easy-to-read font. If the requested transaction requires a real-time approval of the primary user, the user interface presented on primary user device 12 may also include approve and deny buttons, or some other means of communicating the primary user's approval or denial of the requested transaction. As another example, in the case where the primary user is visually impaired, the user interface on primary user device 12 may play audio of the natural language description of the requested transaction to the primary user and the primary user may speak the work "approve" or "deny," or similar messages, in a language of their preference.

The user interface on the primary user device may indicate the name of the assistant user, a date and time at which the transaction was requested, and the natural language description of the requested transaction. As one example, for a requested transfer to the primary user's daughter, the natural language description may read "Transfer US$500 to daughter Anika A/C xxxx8902." In this example, the requested transfer would likely require approval by the primary user prior to being performed. As another example, if the assistant user is viewing account statements for accounts owned by the primary user, the natural language description may read "Viewing Trade Account xxxx6734 Page 1." In this example, the requested viewing may or may not require approval by the primary user depending on the type of account and the access limits specified by the contract and/or the access control token.

In order to generate a natural language description of a given transaction requested by assistant user device 14, assisted session manager 20 may communicate directly with natural language generator 50 to match the requested transaction to one of a plurality of possible activities with the primary user account stored in translation table 52. For example, there may be a finite number of transactions or activities that may be performed with the primary user account via online banking system 8. Translation table 52, therefore, may store each of the possible activities and may map each of the possible activities to a natural language description of the respective activity. Assisted session manager 20 then uses the natural language description mapped to the requested transaction. In some examples, natural language generator 50 may further translate or modify the natural language description based on language settings 54 for the primary user.

In other scenarios, in order to generate the natural language description of the requested transaction, assisted session manger 20 may also communicate with activity manager 40 in order to retrieve banking details associated with the primary user account and the requested transaction from BaaS client 44 and predictive services client 46. For example, assisted session manager 20 may first communicate with activity manager 40 to match the requested transaction to one of the plurality of possible activities with the primary user account stored in activity log 42. In this example, activity log 42 stores each of the possible activities and maps each of the possible activities to an intermediate language description of the respective activity.

Activity manager 40 may communicate with BaaS client 44 to collect relevant banking details from the primary user account and any other accounts owned by the primary user that are stored in accounts 46. In addition, BaaS client 44 may issue a token to enable activity manager 40 to access prior transaction information for the primary user account from predictive services client 46. For example, activity manager 40 may present the token to predictive services client 46, and receive the prior transaction information for the primary user account to determine whether the requested transaction or a similar transaction has previously been performed with the primary user account.

Assisted session manager 20 may then communicate with natural language generator 50 to translate the intermediate language description mapped to the requested transaction into the natural language description for the requested transaction based on language settings 54 for the primary user. For example, the intermediate language description may comprise a machine language description, and natural language generator 50 may be configured to translate the machine language description into one of a plurality of human languages based on language settings 54 for the primary user. Natural language generator 50 may also incorporate the prior transaction information into the natural language description for the requested transaction to indicate to the primary user whether the requested transaction is a known transaction that has previously been performed. In some cases, the natural language descriptions of known transactions may be presented using a different text color or highlighting compared to unknown or new transactions based on language settings 54.

After generating the natural language description, assisted session manager 20 of server 18 sends data representative of the natural language description of the requested transaction to primary user device 12 for display via a user interface on primary user device 12. As described above, the user interface presented on primary user device 12 may also include approve and deny buttons, or some other means of communicating the primary user's approval or denial of the requested transaction. Upon receiving approval of the requested transaction from primary user device 12, assisted session manager 40 communicates with activity manger 40 to perform the requested transaction with the primary user account. For example, activity manager 40 may utilize BaaS client 44 to access the primary user account stored in accounts 48 held by the bank to perform the approved requested transaction.

The assisted session with online banking system 8 may terminate when either the assistant user or the primary user logs out of online banking system 8. In some examples, the assisted session may be terminated at any time by the primary user. For example, upon receiving a termination request from primary user device 12, assisted session manager 20 may terminate the assisted session by terminating access to the primary user account by assistant user device 14. In other examples, the assisted session or the access control token associated with the assisted session may be subject to a time limit, and the assisted session may terminate when the time expires. Once the assisted session is terminated, all of the transactions approved and performed, and/or requested and denied, during the assisted session may be included in a log report and sent to the primary user via mail, email, text, chat, push notification, or the like).

An example use case is described here for illustrative purposes.
1. Dad (primary user) wants to perform a set of one or more transactions.
2. Dad calls his Son (assistant user) and schedules time to conduct an assisted session.
3. At 6:30, Son sits at his computer (e.g., a mobile phone executing a mobile wallet or a computer executing a browser that supports the online banking website).
4. Dad uses his biometric ID to log into the primary user account from his mobile phone, and requests the user interface (UI) for assisted sessions that allows his Son to access the primary user account with a set of limitations. Dad may specify the set of transactions for this assisted session. The system generates an access control token.
5. The generated access control token is time bound, allows only the specified operations, works for only specific individuals (e.g., Dad and his Son), and has limited life. The generated access control token is delivered to the Son's computer using an out-of-band channel.
6. Son enters his own login ID/password along with the newly generated access control token that was received. The Son's computer delivers the generated access control token to the bank server using a secured channel imposed by the bank, such as using the public key infrastructure (PKI) based on the bank's Digital Certificate.
7. Bank's server validates the Son's login credentials and the submitted access control token and allows the Son to access the primary user account identified by the access control token.
8. Son is now logged into his Dad's primary user account.
9. Each transaction or activity requested by the Son is converted into a natural language description based on the accessibility needs of the Dad, such as big and easy to read font size with graphics, icons etc., to Dad's mobile phone. The natural language description may include different language and other locale considerations, e.g., the UI on Son's computer screen is in English and the UI on Dad's mobile phone is in Swahili. Other accessibility methods may use other assistive and adaptive technology. Examples of messages that appear on Dad's mobile phone corresponding to the Son's activities:
   a. Son logged into account
   b. Bill Pay $145.23 to PGE—Approve/Deny (Wait for input from Dad). This transaction might be highlighted in bright green because the Dad had previously specified this transaction to be included in the assisted session.

c. Transfer $55 to Son's girlfriend—Approve/Deny (Wait for input from Dad). This transaction might be highlighted in red because the Dad had not previously specified this transaction to be included in the assisted session, nor was money ever sent to this recipient in any earlier transactions.

d. Transfer $550 to Dad's daughter—Approve/Deny (Wait for input from Dad). This transaction might be highlighted in dull green because the Dad had not previously specified this transaction to be included in the assisted session, but the Dad had initiated and approved a similar transaction in an earlier transaction.

e. Reviewing transactions.

f. Moved to Trade Account.

g. Reviewing Trade Account.

h. Moved to Wealth Account—Approve/Deny (Wait for input from Dad)

i. . . .

j. Logged out.

10. Translation of each transaction or activity into natural language description presented via UI on Dad's mobile phone. Some transactions or activities need approval based on initial configuration.

11. Transactions are complete.

12. A transaction log for the assisted session will be sent to Dad.

Figure 3:
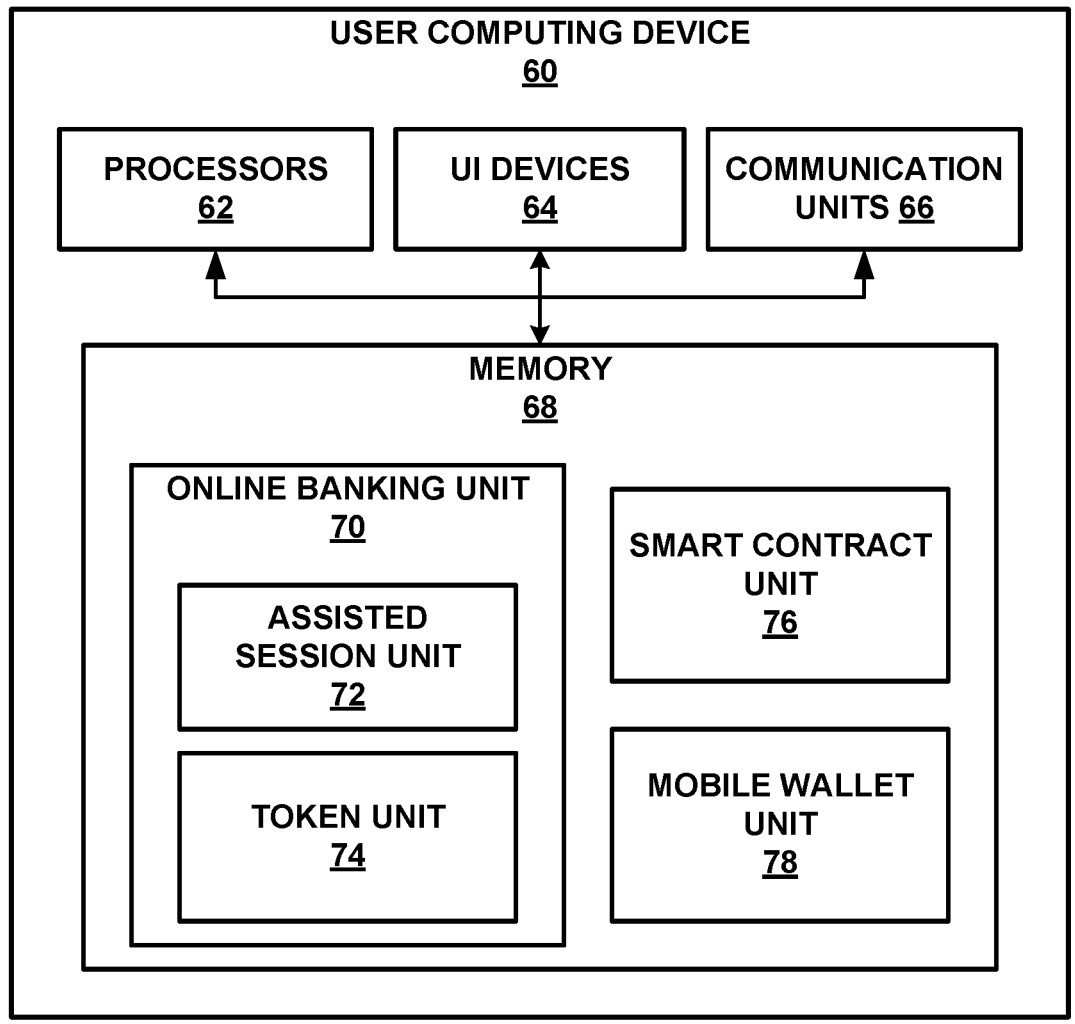
FIG. 3 is a block diagram illustrating an example user computing device configured to participate in an assisted session with an online banking system, in accordance with the techniques of this disclosure.

FIG. 3 is a block diagram illustrating an example user computing device 60 configured to participate in an assisted session with an online banking system, in accordance with the techniques of this disclosure. User computing device 60 may operate substantially similar to either primary user device 12 or assistant user device 14 of FIG. 1. For example, user computing device 60 may communicate with server 18 of bank network 16 to access financial accounts via online banking system 8 of FIG. 1. The architecture of user computing device 60 illustrated in FIG. 3 is shown for exemplary purposes only and user computing device 30 should not be limited to this architecture. In other examples, user computing device 30 may be configured in a variety of ways.

As shown in the example of FIG. 3, user computing device 60 includes one or more processors 62, one or more user interface (UI) devices 64, one or more communication units 66, and one or more memory units 68. User computing device 60 also includes online banking unit 70, smart contract unit 76, and mobile wallet unit 78, each of which may be implemented as program instructions and/or data stored in memory 68 and executable by processors 62 or implemented as one or more hardware units or devices of user computing device 60. Memory 68 of user computing device 60 may also include an operating system (not shown) executable by processors 62 to control the operation of components of user computing device 60. Although not shown in FIG. 3, the components, units or modules of user computing device 60 are coupled (physically, communicatively, and/or operatively) using communication channels for inter-component communications. In some examples, the communication channels may include a system bus, a network connection, an inter-process communication data structure, or any other method for communicating data.

Processors 62, in one example, may comprise one or more processors that are configured to implement functionality and/or process instructions for execution within user computing device 60. For example, processors 62 may be capable of processing instructions stored by memory 68. Processors 62 may include, for example, microprocessors, DSPs, ASICs, FPGAs, or equivalent discrete or integrated logic circuitry, or a combination of any of the foregoing devices or circuitry.

Memory 68 may be configured to store information within user computing device 60 during operation. Memory 68 may include a computer-readable storage medium or computer-readable storage device. In some examples, memory 68 include one or more of a short-term memory or a long-term memory. Memory 68 may include, for example, RAM, DRAM, SRAM, magnetic discs, optical discs, flash memories, or forms of EPROM or EEPROM. In some examples, memory 68 is used to store program instructions for execution by processors 62. Memory 68 may be used by software or applications running on user computing device 60 (e.g., online banking unit 70, smart contract unit 76, and mobile wallet unit 78) to temporarily store information during program execution.

User computing device 60 may utilize communication units 66 to communicate with external devices via one or more networks, e.g., network 10 of FIG. 1. Communication units 66 may be network interfaces, such as Ethernet interfaces, optical transceivers, RF transceivers, or any other type of devices that can send and receive information. Other examples of interfaces may include Wi-Fi, NFC, or Bluetooth radios. In some examples, user computing device 60 utilizes communication units 66 to wirelessly communicate with an external device, such as server 18 of bank network 16 of FIG. 1.

UI devices 64 may be configured to operate as both input devices and output devices. For example, UI devices 64 may be configured to receive tactile, audio, or visual input from a user of user computing device 60. In addition to receiving input from a user, UI devices 64 may be configured to provide output to a user using tactile, audio, or video stimuli. In one example, UI devices 64 may be configured to output content such as a GUI for display at a display device. UI devices 64 may include a presence-sensitive display that displays a GUI and receives input from a user using capacitive, inductive, and/or optical detection at or near the presence sensitive display.

Other examples of UI devices 64 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 64 include a speaker, a cathode ray tube (CRT) monitor, a liquid crystal display (LCD), organic light emitting diode (OLED), or any other type of device that can generate intelligible output to a user.

User computing device 60 may include additional components that, for clarity, are not shown in FIG. 3. For example, user computing device 60 may include a battery to provide power to the components of user computing device 60. Similarly, the components of user computing device 60 shown in FIG. 3 may not be necessary in every example of user computing device 60.

Mobile wallet unit 78 may be implemented as a downloadable or pre-installed application or "app" that is executed by the one or more processors 62 of user computing device 60. Mobile wallet unit 78 manages a virtual wallet stored on user computing device 60 used to perform online transactions. In some examples, a user of user computing device 60 may use the virtual wallet to purchase goods or services via either a website or a point-of-sale device for a merchant configured to receive online payments. The virtual wallet stored on user computing device 60 may include one or more virtual financial assets, which may correspond to any type of digitized financial asset with a monetary value that is held at the user's bank. To perform online transactions using the virtual wallet, mobile wallet unit 78 of user computing device 60 may send messages to the website or the point-of-sale device for the merchant and to a bank server associated with the user's bank for authorization of the transactions.

Online banking unit 70 may also be implemented as a downloadable or pre-installed application or "app" that is executed by the one or more processors 62 of user computing device 60. Online banking unit 70 facilitates secure access to financial accounts in an online banking system, e.g., online banking system 8 of FIGS. 1-2, by an authorized user of user computing device 60. For example, online banking unit 70 may communicate with a server of a bank network that supports the online banking system, e.g., server 18 of bank network 16 of FIGS. 1-2. Online banking unit 70 may support a login user interface of the online banking system on one of UI devices 64, e.g., a display, through which the user of user computing device 60 may enter their access credentials and log into the online banking system. Online banking unit 70 may also support a transaction user interface of the online computing system through which the user of user computing device 60 may view or perform transactions with one or more financial accounts. In some cases, online banking unit 70 may be included in or associated with mobile wallet unit 78 and provide secure access to the financial accounts stored in mobile wallet unit 78.

In accordance with the disclosed techniques, online banking unit 70 includes an assisted session unit 72 configured to facilitate an assisted session with the online banking system during which both a primary user and an assistant user have secure access to the primary user's account via their respective computing devices. In the case where the user is the primary user and user computing device 60 operates as a primary user device, e.g., primary user device 12 of FIG. 1, assisted session unit 72 may facilitate the primary user's registration to participate in assisted sessions with the online banking system. For example, assisted session unit 72 may communicate with smart contract unit 76 executed by one or more processors 62 to facilitate the generation of a contract between the primary user and one or more assistant users.

In addition, after the primary user is logged into the online banking system for an assisted session, assisted session unit 72 may communicate with token unit 74 of online banking unit 70 to generate an access control token for an assistant user to join the assisted session. User computing device 60 may then send the access control token to the assistant user's computing device, e.g., assistant user device 14 of FIG. 1. User computing device 60 may encrypt the access control token via a private key, a public key, or some other encryption scheme.

After the assistant user has joined the assisted session, assisted session unit 72 may support a primary UI on UI devices 64 of user computing device 60 to present natural language descriptions of transactions requested by the assistant user. Based on the type of the requested transaction and the access limitations specified by the contract or the access control toke, the primary UI may also receive either approval or denial of each of the requested transactions from the primary user via UI devices 64. Examples of this user interface are described in more detail with respect to FIGS. 4A-4B.

In the case where the user is the assistant user and user computing device 60 operates as an assistant user device, e.g., assistant user device 14 of FIG. 1, assisted session unit 72 may facilitate the assistant user's registration to participate in assisted sessions with the online banking system. For example, assisted session unit 72 may communicate with smart contract unit 76 executed by one or more processors 62 to facilitate the generation of a contract between the assistant user and one or more primary users.

In addition, after the primary user is logged into the online banking system for an assisted session, user computing device 60 may receive an access control token for the assisted session from either the primary user's computing device or the server of the bank network that supports the online banking system. Token unit 74 of online banking unit 70 may store the access control token for the assisted session, and send the access control token along with the assistant user's access credentials to log into the assisted session with the online banking system. In some examples, user computing device 60 may encrypt the access control token via a public key, e.g., via a public key or some other encryption scheme.

After the assistant user joins the assisted session, assisted session unit 72 may support an assistant UI on UI devices 64 of user computing device 60 that is substantially similar to the transaction user interface of the online computing system through which the user of user computing device 60 may view or perform transactions with one or more financial accounts. The assistant UI allows the assistant user to view and request transactions with the primary user's account subject to the access limits defined in the contract between the parties and the approval of the primary user. Examples of this user interface are described in more detail with respect to FIGS. 4A-4B.

Figure 4A:
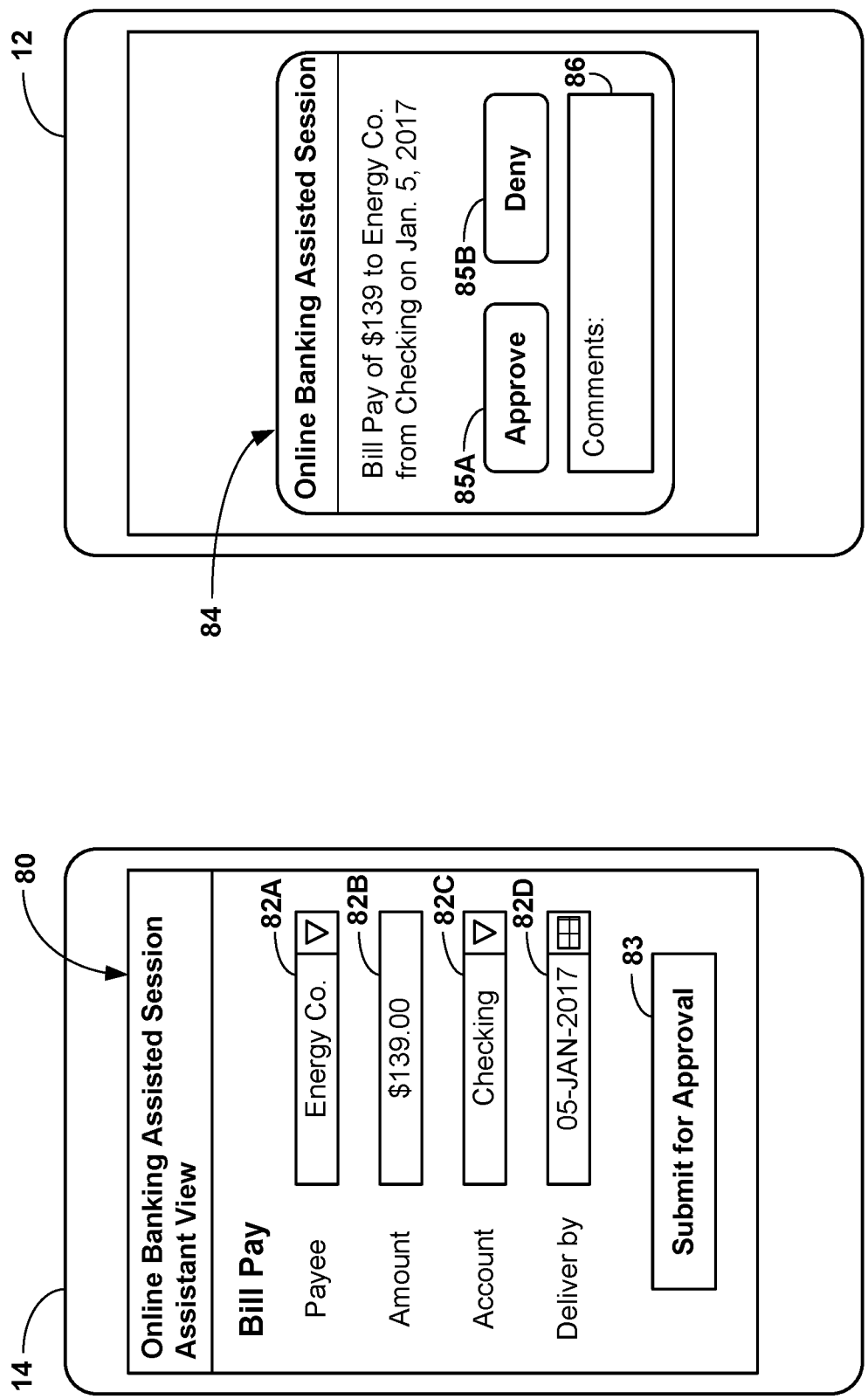
FIGS. 4A and 4B are conceptual diagrams illustrating example user interfaces for an assisted session with the online banking system as described in this disclosure.
Figure 4B:
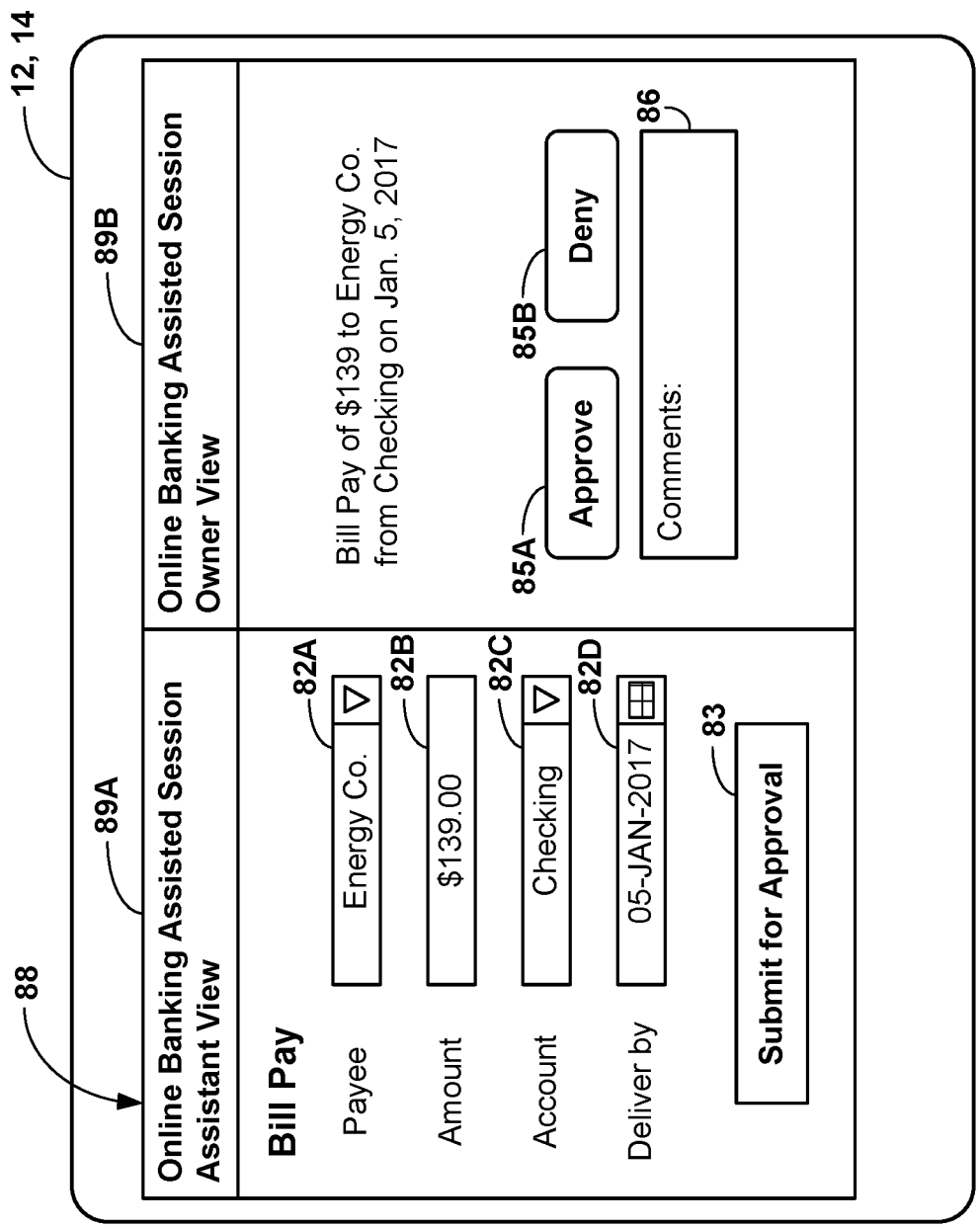

FIGS. 4A and 4B are conceptual diagrams illustrating example user interfaces for an assisted session with the online banking system as described in this disclosure. In the example of FIG. 4A, as part of the assisted session with the online banking system for the primary user account, assisted session manager 20 may send data representative of different user interfaces to assistant user device 14 and primary user device 12. In this example, assisted session manager 20 sends, to assistant user device 14, data representative of a first user interface 80 used to receive a requested transaction with the primary user account from the assistant user. The assistant user may use the first user interface 80 to view the primary user account and request online bill pay, transfer services, or other transactions with the primary user account on behalf of the primary user.

In the example illustrated in FIG. 4A, the assistant user interacts with first user interface 80 on assistant user device 14 to request an online bill pay transaction with the primary user account. For example, first user interface 80 includes fillable fields for the assistant user to specify a payee 82A, a payment amount 82B, an account 82C of the primary user from which the payment should be pulled, and a "deliver by" date 82D by which the payment should be delivered to the payee. Different than a user interface for transaction by a primary user that typically includes a "confirm" button, first user interface 80 for the assistant user includes a "submit for approval" button 83. Upon entering the necessary information into fields 82 for the bill pay transaction, the assistant user selects the "submit for approval" button 83 to trigger generation of the natural language description of the transaction and approval or denial of the transaction by the primary user.

Assisted session manager 20 also sends, to primary user device 12, data representative of a second user interface 84 that is different than first user interface 80 and is used to present the natural language descriptions of the requested transactions and receive either approval or denial of each of the requested transactions from the primary user. In the example illustrated in FIG. 4A, the second user interface 80 includes the natural language description of the online bill pay transaction being requested by the assistant user, namely "Bill Pay of $139 to Energy Co. from Checking on Jan. 5, 2017." The primary user then interacts with second user interface 80 on primary user device 12 to approve or deny the requested transaction by selecting either an "approve" button 85A or a "deny" button 85B. The primary user's decision to approve or deny the requested transaction may be presented to the assistant user via first user interface 80.

In addition, as illustrated in FIG. 4A, second user interface 80 has a "comments" dialog box 86 through which the primary user may be able to provide a reason or explanation as to why a certain requested transaction is denied, and/or request the assistant user to perform a slightly different transaction than the one requested. In some examples, assisted session manager 20 may provide a communication platform, e.g., text, chat, voice, and/or video conference, within each of the first and second user interfaces 80, 84 for the assisted session to enable the primary user and the assistant user to discuss the requested transaction in real time.

In the example of FIG. 4A, the primary user of primary user device 12 does not see first user interface 80 or what the assistant user is doing in the primary user account of the online banking system. This may be desirable by those primary users that cannot understand the online banking system such that having to view the same user interface as the assistant user may only confuse or annoy the primary user. In this example, the primary user of primary user device 12 instead only interacts with second user interface 84 to receive the natural language descriptions of the requested transactions and input approval or denial of each of the requested transactions. In some examples, as illustrated in FIG. 4A, second user interface 86 may be included in a pop-up window or a push notification on primary user device 12 such that the primary user may use primary user device 12 for other matters while remaining logged into the primary user account via the online banking system, and only interact with second user interface 84 when needed.

In the example of FIG. 4B, as part of the assisted session with the online banking system for the primary user account, assisted session manager 20 may send data representative of a single shared user interface 88 to both primary user device 12 and assistant user device 14. Shared user interface 88 may include a split screen interface having a first window 89A controlled by assistant user device 14 and a second window 89B controlled by primary user device 12. Second window 89B may present either the same content or different content than first window 89A of shared user interface 88. In the example illustrated in FIG. 4B, second window 89B presents different content than first window 89A.

Assistant user device 14 is given control of first window 89A of shared user interface 88 to request online bill pay, transfer services, or other transactions with the primary user account on behalf of the primary user. In the example illustrated in FIG. 4B, the assistant user interacts with first window 89A of shared user interface 88 to request an online bill pay transaction with the primary user account in the same manner as described above with respect to FIG. 4A.

Primary user device 12 is given control of second window 89B of shared user interface 88 to approve or deny the requested transactions with the primary user account. In the example illustrated in FIG. 4B, the second user interface 80 includes the natural language description of the online bill pay transaction being requested by the assistant user. The primary user then interacts with second user interface 80 on primary user device 12 to approve or deny the requested transaction in the same manner as described above with respect to FIG. 4A. Assisted session manager 20 may also provide a communication platform, e.g., text, chat, voice, and/or video conference, within shared user interface 88 for the assisted session to enable the primary user and the assistant user to discuss the requested transaction in real time.

When primary user device 12 and assistant user device 14 are accessing the same account simultaneously, shared user interface 88 may provide different cursors used by each of the users. For example, assistant user device 14 may control a first cursor that has a certain appearance and is only movable within first window 89A. Primary user device 12 may control a second cursor that has a different appearance than the first cursor, and is only moveable within second window 89B.

In addition, shared user interface 88 may provide each of primary user device 12 and assistant user device 14 with controls over the communication platform. For example, primary user device 12 or assistant user device 14 may adjust the speaker volume and microphone input. Either user may add a video call or request help from a help desk associated with online banking system 8. When a video call is added to shared user interface 88, a small video window may pop up (not shown) and provide live images of the users. When either user requests help from the help desk, a help desk agent may join in a voice conversation, video call, or chat that is presented to both primary user device 12 and assistant user device 14 via shared used interface 88. In the case where the help desk agent joins the assisted session, shared user interface 88 may provide a third cursor for the help desk agent that is movable across first window 89A and second window 89B of shared user interface 88 in order to give instructions or edit contents with permission of the respective users.

In some examples, shared user interface 88 may provide a synchronized mode of operation that is selectable by either primary user device 12 or assistant user device 14 and forces the other user to view the same webpage as the first user. For example, the assistant user may select the synchronization mode in order to call the primary user's attention to a potential discrepancy in an account statement by mirroring first window 89A onto second window 89B.

Shared user interface 88 may also provide the primary user with the option to change access permissions to the primary user account for the assistant user during the assisted session. For example, primary user device 12 may select between a single editor mode or multiple editor mode. When shared user interface 88 is in a single editor mode, only the primary user may perform transactions or change content. When shared user interface 88 is in the multiple editor mode, both the primary user and the assistant user may perform or request transactions and/or change content. When in the multiple editor mode, user interface 88 may automatically reconcile the transactions or changes, or the primary user may request reconciliation of the transactions or changes.

In the example of FIG. 4B, the primary user of primary user device 12 may view the actions of the assistant user of assistant user device 14 in first window 89A of shared user interface 88 presented on primary user device 12, which may provide an additional layer of security as the primary user is able to see everything that the assistant user is doing in the primary user account. This may be desirable by those primary users that understand the online banking system but may be physically unable to use the online banking system without assistance.

Figure 5:
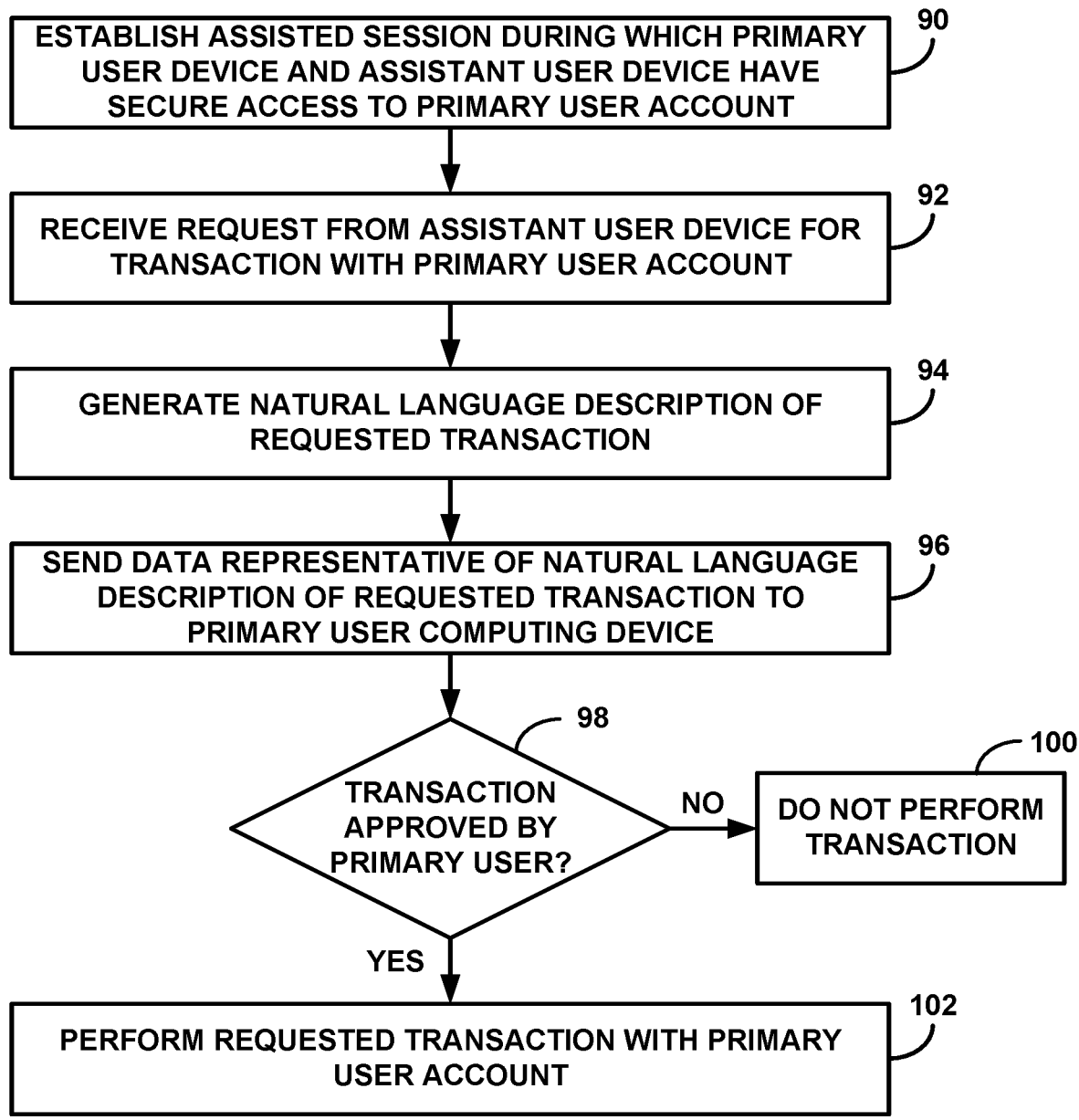
FIG. 5 is a flowchart illustrating an example operation of a server of an online banking system providing an assisted session for a primary user account, in accordance with the techniques of this disclosure.

FIG. 5 is a flowchart illustrating an example operation of a server of an online banking system providing an assisted session for a primary user account, in accordance with the techniques of this disclosure. The example operation of FIG. 5 is described with respect to server 18 of online banking system 8 from FIGS. 1 and 2. As illustrated in FIGS. 1 and 2, server 18 executes an assisted session manager 20 configured to communicate with one or more devices within bank network 16 in order to facilitate the assisted session between primary user device 12 and assistant user device 14.

Assisted session manager 20 of server 18 first establishes the assisted session for the primary user account during which both primary user device 12 and assistant user device 14 have secure access to the primary user account (90). An example operation of establishing the assisted session for the primary user account is described in more detail below with respect to FIG. 6.

In some examples, establishing the assisted session may be viewed as transferring the session with the online banking system for the primary user account from primary user device 12 to assistant user device 14. According to the techniques, although the assistant user is transferred control over the online banking session for the primary user account, the primary user retains the ability to deny any transactions requested by the assistant user and the ability to terminate the assisted session at any time. For example, upon receiving a termination request from primary user device 12, assisted session manager 20 may terminate the assisted session by terminating access to the primary user account by assistant user device 14.

Once the assisted session is established, assisted session manager 20 of server 18 receives a request from assistant user device 14 for a transaction with the primary user account (92). According to the disclosed techniques, assisted session manger 20 communicates with natural language generator 50 to generate a natural language description of the requested transaction (94).

In one example, upon receiving the requested transaction, assisted session manager 20 may communicate directly with natural language generator 50 to match the requested transaction to one of a plurality of possible activities with the primary user account stored in translation table 52. In this example, each of the plurality of possible activities stored in translation table 52 is mapped to a natural language description of the respective activity. Assisted session manager 20 then uses the natural language description mapped to the one of the plurality of possible activities for the requested transaction. In some examples, natural language generator 50 may further translate or modify the natural language description based on language settings 54 for the primary user.

In another example, upon receiving the requested transaction, assisted session manager 20 may first communicate with activity manager 40 to match the requested transaction to one of a plurality of possible activities with the primary user account stored in activity log 42. In this example, each of the plurality of possible activities stored in activity log 42 is mapped to an intermediate language description of the respective activity. Assisted session manager 20 may then communicate with natural language generator 50 to translate the intermediate language description mapped to the one of the plurality of possible activities into the natural language description for the requested transaction based on language settings 54 for the primary user. For example, the intermediate language description may comprise a machine language description, and natural language generator 50 may be configured to translate the machine language description into one of a plurality of human languages based on language settings 54 for the primary user.

Language settings 54 may include more than just a human language preference of the primary user. For example, natural language generator 50 may generate at least one of text, audio, a picture, or a video that represents the requested transaction according to the primary user's preferred form of communication based on language settings 54. As another example, in the case where the primary user prefers text-based communication, natural language generator 50 may generate text that represents the requested transaction having at least one of a specific font, color, size, or format based on language settings 54.

In some examples, in addition to retrieving an intermediate language description for the requested transaction from activity log 42, activity manager 40 may also retrieve banking details associated with the primary user account and the requested transaction from banking as a service client 44 and predictive services client 46. Specifically, activity manager 40 may retrieve prior transaction information for the primary user account to determine whether the requested transaction or a similar transaction has previously been performed from the primary user account. Natural language generator 50 may then incorporate the prior transaction information into the natural language description for the requested transaction to indicate to the primary user whether the requested transaction is a known transaction that has previously been performed. In some cases, known transactions may be represented in the natural language description using a different text color or highlighting than unknown or new transactions based on language settings 54.

After generating the natural language description, assisted session manager 20 of server 18 sends data representative of the natural language description of the requested transaction to primary user device 12 (96). For example, upon receiving the data, primary user device 12 may present a user interface that includes the natural language description of the requested transaction and a request for either approval or denial of the requested transaction. In some examples, assisted session manager 20 may provide a communication platform, e.g., text, chat, voice, and/or video conference, within the assisted session to enable the primary user and the assistant user to discuss the requested transaction in real time.

In the case where the primary user denies the requested transaction (NO branch of 98), assisted session manager 20 of server 18 does not perform the requested transaction. In some examples, assisted session manager 20 may send a notification to assistant user device 14 indicating that the requested transaction was denied by the primary user. In some examples, the primary user may be able to provide a reason or explanation as to why the transaction was denied, or the primary user may request performance of a slightly different transaction than the one requested.

In the case where the primary user approves the requested transaction (YES branch of 98), assisted session manager 20 of server 18 communicates with activity manger 40 to perform the requested transaction with the primary user account (102). For example, activity manager 40 may utilize banking as a service client 44 to access the primary user account from accounts 48 held by the bank to perform the approved requested transaction.

Figure 6:
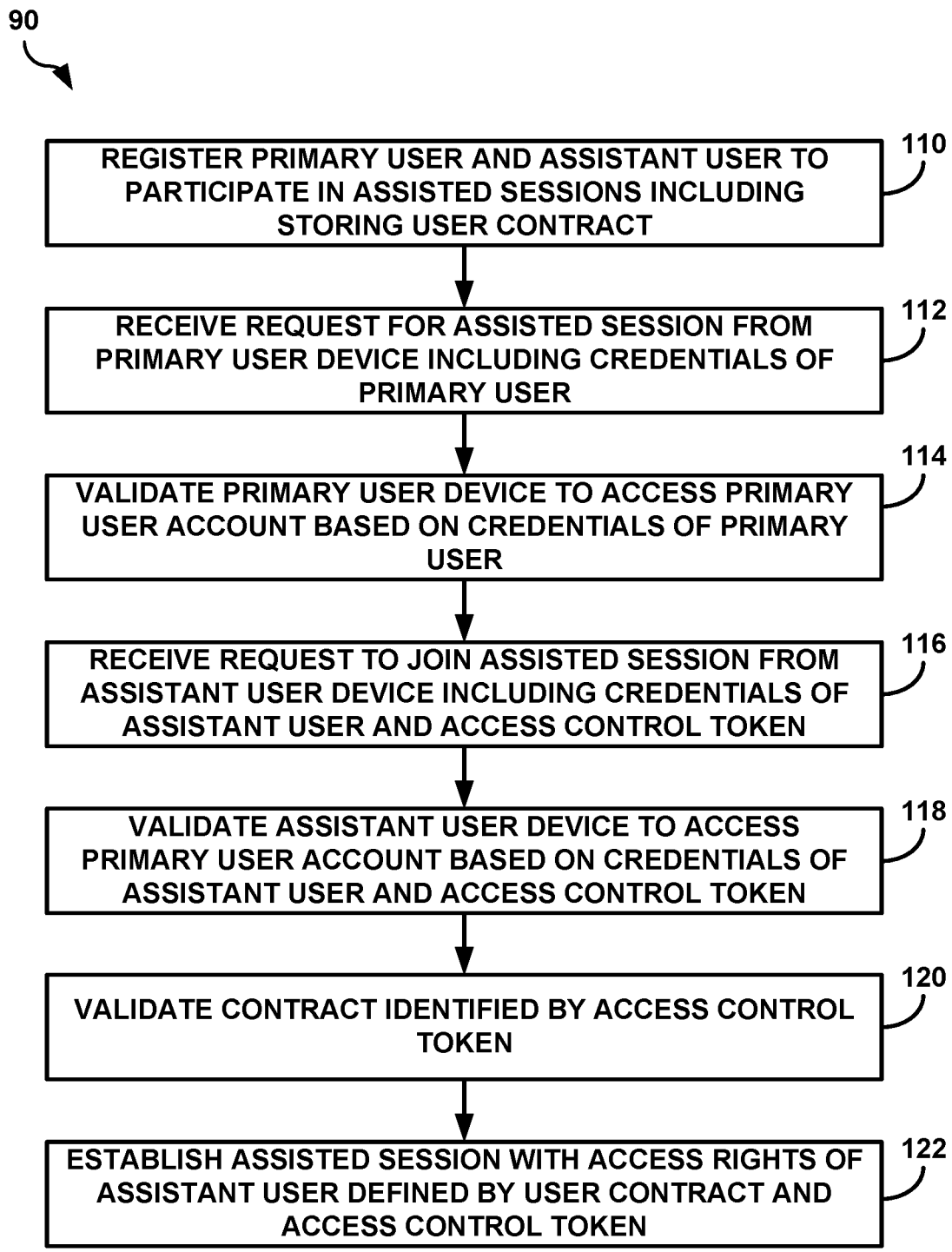
FIG. 6 is a flowchart illustrating an example operation of the server of the online banking system establishing the assisted session for the primary user account, in accordance with the techniques of this disclosure.

FIG. 6 is a flowchart illustrating an example operation of the server of the online banking system establishing the assisted session for the primary user account, in accordance with the techniques of this disclosure. The example operation of FIG. 6 is described with respect to server 18 of online banking system 8 from FIGS. 1 and 2. The example operation of establishing the assisted session may be a more detailed example of step 90 from FIG. 5.

Registration unit 32 of server 18 registers a primary user and an assistant user to participate in assisted sessions for the primary user account including storing a contract between the primary user and the assistant user that defines access rights to the primary user account for the assistant user (110). The contract may be a pre-existing contract or may be created in real time as needed. In some examples, the contract is a "smart" contract between the primary user and the assistant user (or between their computing devices 12, 14). The smart contract may be established between the users or their devices using blockchain, cloud servers, or bank servers, e.g., server 18. For example, server 18 communicates with smart contract manager 36 within bank network 16 to store the contract with a unique contract ID in contract database 38. The contract ID is linked to the relationship between the primary user and the assistant user.

Server 18 receives a request for an assisted session with the online banking system for the primary user account from the primary user device 12, the request including credentials of the primary user of primary user device 12 (112). Authentication unit 30 of server 18 validates primary user device 12 to access the primary user account based on the credentials of the primary user (114). Token generator 34 of server 18 may generate an access control token for assistant user device 14 in response to validating primary user device 12 for the requested assisted session. In other examples, primary user device 12 may generate the access control token for assistant user device 14 upon being validated for the requested assisted session, and send the access control token to server 18 and assistant user device 14.

The access control token may specify at least the primary user, the assistant user, the primary user account, and the unique contract ID that identifies the contract between the primary user and the assistant user (or their devices). In some examples, along with the request for the assisted session from primary user device 12, server 18 may receive one or more types of transactions to be performed by the assistant user during the requested assisted session. Token generator 34 may generate the access control token further specifying the one or more types of transactions allowed for the assisted session. Once generated, server 18 may send the access control token to assistant user device 14 via an out-of-band communication channel, e.g., via text, chat, SMS, email, or other messaging service, which is different than the in-band communication channel over which server 18 authorizes access to the primary user account by assistant user device 14.

Server 18 next receives a request to join the assisted session for the primary user account from assistant user device 14, the request including credentials of an assistant user of the assistant user device and the access control token (116). In some cases, the unique contract ID may represent a public key of a public/private encryption key pair, secret sharing, or another mechanism used to encrypt the access control token. In this way, assistant user device 14 may use the unique contract ID to encrypt the access control token prior to inclusion in the request to join the assisted session sent over the in-bank communication sessions. Upon receipt, server 18 may decrypt the access control token, e.g., with a private key of the encryption key pair known only to server 18.

Authentication unit 30 of server 18 validates assistant user device 14 to access the primary user account based on the credentials of the assistant user and the access control token (118). Upon receiving the access control token from assistant user device 14 with the request to join the assisted session, authentication unit 30 of server 18 may also validate the contract identified by the unique contract ID specified by the access control token (120). Assisted session manager 20 of server 18 may then establish the assisted session with access rights to the primary user account for the assistant user defined by the contract and/or the access control token (122). For example, the contract may define default access rights to the primary user account for the assistant user, and the access control token may define assisted session-specific access rights to the primary user account for the assistant user, e.g., the types of transactions allowed for the assisted session.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computer-implemented method comprising:
   establishing, by a server, an assisted communication session with an existing primary user account via an online banking system during which both a primary user device and an assistant user device have secure access to the primary user account via the online banking system;
   sending, by the server and to each of the primary user device and the assistant user device upon establishment of the assisted communication session, data representative of a user interface to facilitate interaction with the primary user account by both the primary user device and the assistant user device during the assisted communication session;
   receiving, by the server and from the assistant user device via the user interface presented on the assistant user device, a request for a transaction with the primary user account on behalf of a primary user of the primary user account during the assisted communication session;
   generating, by the server, a natural language description of the requested transaction, wherein generating the natural language description comprises:
      matching the requested transaction to one of a plurality of possible activities with the primary user account, wherein each of the plurality of possible activities is associated with a natural language description of the respective activity, and
      using the natural language description associated with the one of the plurality of possible activities for the requested transaction;
   sending, by the server and to the primary user device, a request for approval during the assisted communication session, the request for approval including data representative of the natural language description of the requested transaction for presentation to the primary user via the user interface presented on the primary user device; and
   in response to receiving approval of the requested transaction from the primary user device during the assisted communication session via the user interface presented on the primary user device, performing, by the server, the requested transaction with the primary user account.

2. The method of claim 1, wherein each of the plurality of possible activities is mapped to the natural language description of the respective activity in a database table.

3. The method of claim 1,
   wherein each of the plurality of possible activities is mapped to an intermediate language description of the respective activity in a database table; and
   wherein matching the requested transaction to the one of the plurality of possible activities further comprises translating the intermediate language description mapped to the one of the plurality of possible activities into the natural language description for the requested transaction based on language settings for a primary user of the primary user device.

4. The method of claim 3, wherein translating the intermediate language description into the natural language description comprises translating a machine language description into one of a plurality of human languages based on the language settings for the primary user.

5. The method of claim 1, wherein generating the natural language description of the requested transaction comprises generating at least one of text, audio, a picture, or a video that represents the requested transaction based on language settings for a primary user of the primary user device.

6. The method of claim 1, wherein generating the natural language description of the requested transaction comprises generating text that represents the requested transaction having at least one of a specific font, color, size, or format based on language settings for a primary user of the primary user device.

7. The method of claim 1, wherein generating the natural language description of the requested transaction comprises:
   determining prior transaction information for the primary user account; and
   generating the natural language description to represent the requested transaction and the prior transaction information.

8. The method of claim 1, further comprising registering, by the server, a primary user of the primary user device and an assistant user of the assistant user device to participate in assisted communication sessions with the existing primary user account, wherein registering the primary user and the assistant user comprises storing, by the server, a contract between the primary user and the assistant user that defines access rights to the primary user account for the assistant user.

9. The method of claim 1, wherein establishing the assisted communication session with the existing primary user account comprises:

receiving, by the server and from the primary user device, a request for the assisted communication session, the request including credentials of a primary user of the primary user device;

validating, by the server, the primary user device to access the primary user account based on the credentials of the primary user;

receiving, by the server and from the assistant user device, a request to join the assisted communication session, the request including credentials of an assistant user of the assistant user device and an access control token; and validating, by the server, the assistant user device to access the primary user account based on the credentials of the assistant user and the access control token.

10. The method of claim 9, further comprising:

receiving, by the server and from the primary user device, one or more types of transactions to be performed by the assistant user during the assisted communication session;

generating, by the server, the access control token specifying the one or more types of transactions identified by the primary user device for the assisted communication session; and sending, by the server, the access control token to the assistant user device via an out-of-band communication channel.

11. The method of claim 9, wherein the access control token specifies at least the primary user, the assistant user, the primary user account, and a contract identifier that identifies a contract between the primary user and the assistant user, the method further comprising validating the contract identified by the access control token, and establishing the assisted communication session with access rights to the primary user account for the assistant user defined by at least one of the contract or the access control token.

12. The method of claim 1, wherein sending the data representative of the user interface during the assisted communication session comprises:

sending, by the server and to the assistant user device, data representative of a first user interface used to receive the request for the transaction with the primary user account from an assistant user of the assistant user device; and sending, by the server and to the primary user device, data representative of a second user interface that is different than the first user interface, wherein the second user interface is used to present the natural language description of the requested transaction to the primary user of the primary user device, and receive either approval or denial of the requested transaction from the primary user of the primary user device.

13. The method of claim 1, wherein sending the data representative of the user interface during the assisted communication session comprises sending, by the server and to each of the primary user device and the assistant user device, data representative of a shared user interface, wherein the shared user interface includes a first window controlled by the assistant user device and a second window controlled by the primary user device, the second window having either the same content or different content than the first window.

14. A server device comprising:

a memory; and one or more processors in communication with the memory and configured to:

establish an assisted communication session with an existing primary user account via an online banking system during which both a primary user device and an assistant user device have secure access to the primary user account via the online banking system;

send, to each of the primary user device and the assistant user device upon establishment of the assisted communication session, data representative of a user interface to facilitate interaction with the primary user account by both the primary user device and the assistant user device during the assisted communication session;

receive, from the assistant user device via the user interface presented on the assistant user device, a request for a transaction with the primary user account on behalf of a primary user of the primary user account during the assisted communication session;

generate a natural language description of the requested transaction, wherein the one or more processors are configured to:

match the requested transaction to one of a plurality of possible activities with the primary user account, wherein each of the plurality of possible activities is associated with a natural language description of the respective activity, and use the natural language description associated with the one of the plurality of possible activities for the requested transaction;

send, to the primary user device, a request for approval during the assisted communication session, the request for approval including data representative of the natural language description of the requested transaction for presentation to the primary user via the user interface presented on the primary user device; and in response to receiving approval of the requested transaction from the primary user device during the assisted communication session via the user interface presented on the primary user device, perform the requested transaction with the primary user account.

15. The server of claim 14, wherein each of the plurality of possible activities is mapped to the natural language description of the respective activity in a database table.

16. The server of claim 14, wherein each of the plurality of possible activities is mapped to an intermediate language description of the respective activity in a database table; and wherein to match the requested transaction to the one of the plurality of possible activities, the one or more processors are configured to translate the intermediate language description mapped to the one of the plurality of possible activities into the natural language description for the requested transaction based on language settings for a primary user of the primary user device.

17. The server of claim 14, wherein, to generate the natural language description of the requested transaction, the one or more processors are configured to generate at least one of text, audio, a picture, or a video that represents the requested transaction based on language settings for a primary user of the primary user device.

18. The server of claim 14, wherein, to generate the natural language description of the requested transaction, the one or more processors are configured to generate text that represents the requested transaction having at least one of a specific font, color, size, or format based on language settings for a primary user of the primary user device.

19. The server of claim 14, wherein, to generate the natural language description of the requested transaction, the one or more processors are configured to:
    determine prior transaction information for the primary user account; and
    generate the natural language description to represent the requested transaction and the prior transaction information.

20. A computer-readable storage medium storing instructions that, when executed, cause one or more processors of a server device to:
    establish an assisted communication session with an existing primary user account via an online banking system during which both a primary user device and an assistant user device have secure access to the primary user account via the online banking system;
    send, to each of the primary user device and the assistant user device upon establishment of the assisted communication session, data representative of a user interface to facilitate interaction with the primary user account by both the primary user device and the assistant user device during the assisted communication session;
    receive, from the assistant user device via the user interface presented on the assistant user device, a request for a transaction with the primary user account on behalf of a primary user of the primary user account during the assisted communication session;
    generate a natural language description of the requested transaction, wherein the instructions further cause the one or more processors to:
        match the requested transaction to one of a plurality of possible activities with the primary user account, wherein each of the plurality of possible activities is associated with a natural language description of the respective activity, and
        use the natural language description associated with the one of the plurality of possible activities for the requested transaction;
    send, to the primary user device, a request for approval during the assisted communication session, the request for approval including data representative of the natural language description of the requested transaction for presentation to the primary user via the user interface presented on the primary user device; and
    in response to receiving approval of the requested transaction from the primary user device during the assisted communication session via the user interface presented on the primary user device, perform the requested transaction with the primary user account.

\* \* \* \* \*